United States Patent
Ghuge et al.

(10) Patent No.: US 11,782,880 B2
(45) Date of Patent: Oct. 10, 2023

(54) SYNCHRONIZING LOG DATA WITHIN A CLUSTER

(71) Applicant: International Business Machines Corporation, Armonk, NY (US)

(72) Inventors: Deepak Ghuge, Sangamner (IN); Chetan R Kulkarni, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 16/239,793

(22) Filed: Jan. 4, 2019

(65) Prior Publication Data

US 2020/0218697 A1 Jul. 9, 2020

(51) Int. Cl.
*G06F 16/178* (2019.01)
*G06F 16/13* (2019.01)
*G06F 16/17* (2019.01)

(52) U.S. Cl.
CPC ............ *G06F 16/178* (2019.01); *G06F 16/13* (2019.01); *G06F 16/1734* (2019.01)

(58) Field of Classification Search
CPC .... G06F 16/178; G06F 16/1734; G06F 16/13; H04J 3/0664
See application file for complete search history.

(56) References Cited

U.S. PATENT DOCUMENTS

| | | | | |
|---|---|---|---|---|
| 5,805,870 A * | 9/1998 | Browning | ................. | G06F 1/14 713/375 |
| 6,347,084 B1 * | 2/2002 | Hulyalkar | .......... | H04Q 11/0478 370/347 |
| 6,510,150 B1 * | 1/2003 | Ngo | ..................... | H04J 3/0655 370/347 |
| 7,239,581 B2 * | 7/2007 | Delgado | ................... | G06F 1/12 713/400 |
| 7,937,232 B1 * | 5/2011 | Chow | .................... | G05B 21/02 713/400 |
| 8,559,412 B1 * | 10/2013 | Nicholls | ........... | H04W 56/0015 370/350 |
| 9,183,148 B2 | 11/2015 | Fried et al. | | |
| 9,396,216 B2 | 7/2016 | Barreto et al. | | |
| 9,722,739 B2 * | 8/2017 | Chapman | ................ | H04L 47/12 |
| 10,671,596 B1 * | 6/2020 | Natanzon | ............ | G06F 11/2074 |
| 2004/0236746 A1 * | 11/2004 | Lomet | ................. | G06F 16/2322 |
| 2008/0208938 A1 * | 8/2008 | Lin | ..................... | G06F 16/2343 |
| 2010/0318495 A1 * | 12/2010 | Yan | ........................ | G06F 16/27 707/618 |

(Continued)

FOREIGN PATENT DOCUMENTS

CN 103856354 A 6/2014

OTHER PUBLICATIONS

Park et al., "File Defragmentation Scheme for a Log-Structured File System", Published by ACM File Defragmentation Scheme for a Log-Structured File System, pp. 1-7 (Year: 2016).*

(Continued)

*Primary Examiner* — Mark D Featherstone
*Assistant Examiner* — Kweku William Halm
(74) *Attorney, Agent, or Firm* — Zilka-Kotab, P.C.

(57) ABSTRACT

A computer-implemented method according to one embodiment includes compiling log data from all nodes of a cluster, retrieving a timestamp table stored within the cluster, optimizing the timestamp table, and adjusting the log data from all the nodes of a cluster, utilizing the timestamp table.

20 Claims, 5 Drawing Sheets

(56) References Cited

U.S. PATENT DOCUMENTS

| | | | | |
|---|---|---|---|---|
| 2012/0017093 | A1* | 1/2012 | Savitzky | G06F 21/725 713/178 |
| 2012/0109906 | A1* | 5/2012 | Wagner | G06F 16/27 707/690 |
| 2014/0304401 | A1* | 10/2014 | Jagadish | H04L 41/0853 709/224 |
| 2015/0120915 | A1* | 4/2015 | Erb | H04L 63/102 709/224 |
| 2016/0147618 | A1 | 5/2016 | Lee et al. | |
| 2016/0182319 | A1* | 6/2016 | Martin | H04L 43/0894 370/241 |
| 2017/0177448 | A1* | 6/2017 | Muth | G06F 3/064 |
| 2017/0201606 | A1* | 7/2017 | Ding | G06F 1/14 |
| 2018/0052858 | A1* | 2/2018 | Soncodi | G06F 16/13 |
| 2018/0062956 | A1* | 3/2018 | Schultz | G06F 21/33 |
| 2018/0102938 | A1* | 4/2018 | Yoon | G06F 16/358 |
| 2018/0176874 | A1* | 6/2018 | Wang | H04W 56/004 |
| 2019/0243683 | A1* | 8/2019 | Botelho | G06F 3/067 |
| 2019/0286440 | A1* | 9/2019 | Leonard | G06F 8/60 |
| 2019/0297588 | A1* | 9/2019 | Roy | H04W 56/001 |

OTHER PUBLICATIONS

Michel et al., "Synchronizing multimodal data streams acquired using commodity hardware", VSSN '06: Proceedings of the 4th ACM international workshop on Video surveillance and sensor networksOctober pp. 3-8 (Year: 2006).*

David L. Mills "Improved algorithms for synchronizing computer network clocks" (Year: 1994).*

Jubran et al., "Formal approach to guard time optimization for TDMA" RTNS '13: Proceedings of the 21st International conference on Real-Time Networks and Systems Oct. 2013 pp. 223-233 https://doi.org/10.1145/2516821.2516849 (Year: 2013).*

Aoun et al., "Efficient time synchronization for wireless sensor networks in an industrial setting" SenSys '08: Proceedings of the 6th ACM conference on Embedded network sensor systems Nov. 2008 pp. 419-420 https://doi.org/10.1145/1460412.1460482 (Year: 2008).*

Lenzen et al., "Optimal clock synchronization in networks" SenSys '09: Proceedings of the 7th ACM Conference on Embedded Networked Sensor Systems Nov. 2009, pp. 225-238 https://doi.org/10.1145/1644038.1644061 (Year: 2009).*

"Accurate time synchronization of ultrasonic TOF measurements in IEEE 802.15.4 based wireless sensor networks," https://www.researchgate.net/publication/257640613_Accurate_time_synchronization_of_ultrasonic_TOF_measurements_in_IEEE_802154_based_wireless_sensor_networks (Year: 2013).*

IBM, "Overview of IBM Spectrum Scale," IBM Knowledge Center, 2018, 1 page, retrieved on Jan. 2, 2019, from https://www.ibm.com/support/knowledgecenter/en/STXKQY_4.2.3/com.ibm.spectrum.scale.v4r23.doc/bl1ins_intro.htm.

Wikipedia, "Network Time Protocol," Wikipedia, 2018, 11 pages, retrieved from https://en.wikipedia.org/wiki/Network_Time_Protocol.

* cited by examiner

SYNCHRONIZING LOG DATA WITHIN A CLUSTER

BACKGROUND

The present invention relates to data synchronization, and more specifically, this invention relates to synchronizing log data within a clustered computing environment.

Log files are commonly used by computing devices to log the time and/or date of a particular event. For example, within a cluster of different nodes, each node may create its own set of log files in response to various events. However, the timing information (e.g., clock data, etc.) of each node may differ from other nodes within the cluster. As a result, log files for different nodes within the cluster may not be time-synchronized. This may create problems when performing actions associated with the log files (e.g., debugging actions, etc.).

SUMMARY

A computer-implemented method according to one embodiment includes compiling log data from all nodes of a cluster, retrieving a timestamp table stored within the cluster, optimizing the timestamp table, and adjusting the log data from all the nodes of a cluster, utilizing the timestamp table.

According to another embodiment, a computer program product for synchronizing log data within a cluster includes a computer readable storage medium having program instructions embodied therewith, where the computer readable storage medium is not a transitory signal per se, and where the program instructions are executable by a processor to cause the processor to perform a method including compiling, utilizing the processor, log data from all nodes of a cluster, retrieving, utilizing the processor, a timestamp table stored within the cluster, optimizing, utilizing the processor, the timestamp table, and adjusting, utilizing the processor, the log data from all the nodes of a cluster, utilizing the timestamp table.

According to another embodiment, a system includes a processor, and logic integrated with the processor, executable by the processor, or integrated with and executable by the processor, where the logic is configured to compile log data from all nodes of a cluster, retrieve a timestamp table stored within the cluster, optimize the timestamp table, and adjust the log data from all the nodes of a cluster, utilizing the timestamp table.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for synchronizing log data within a cluster. Various embodiments provide a method to retrieve a timestamp table from a cluster, optimize the timestamp table, and adjust retrieved log data, utilizing the optimized timestamp table.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for synchronizing log data within a cluster.

In one general embodiment, a computer-implemented method includes compiling log data from all nodes of a cluster, retrieving a timestamp table stored within the cluster, optimizing the timestamp table, and adjusting the log data from all the nodes of a cluster, utilizing the timestamp table.

In another general embodiment, a computer program product for synchronizing log data within a cluster includes a computer readable storage medium having program instructions embodied therewith, where the computer readable storage medium is not a transitory signal per se, and where the program instructions are executable by a processor to cause the processor to perform a method including compiling, utilizing the processor, log data from all nodes of a cluster, retrieving, utilizing the processor, a timestamp table stored within the cluster, optimizing, utilizing the processor, the timestamp table, and adjusting, utilizing the processor, the log data from all the nodes of a cluster, utilizing the timestamp table.

In another general embodiment, a system includes a processor, and logic integrated with the processor, executable by the processor, or integrated with and executable by the processor, where the logic is configured to compile log data from all nodes of a cluster, retrieve a timestamp table stored within the cluster, optimize the timestamp table, and adjust the log data from all the nodes of a cluster, utilizing the timestamp table.

Figure 1:
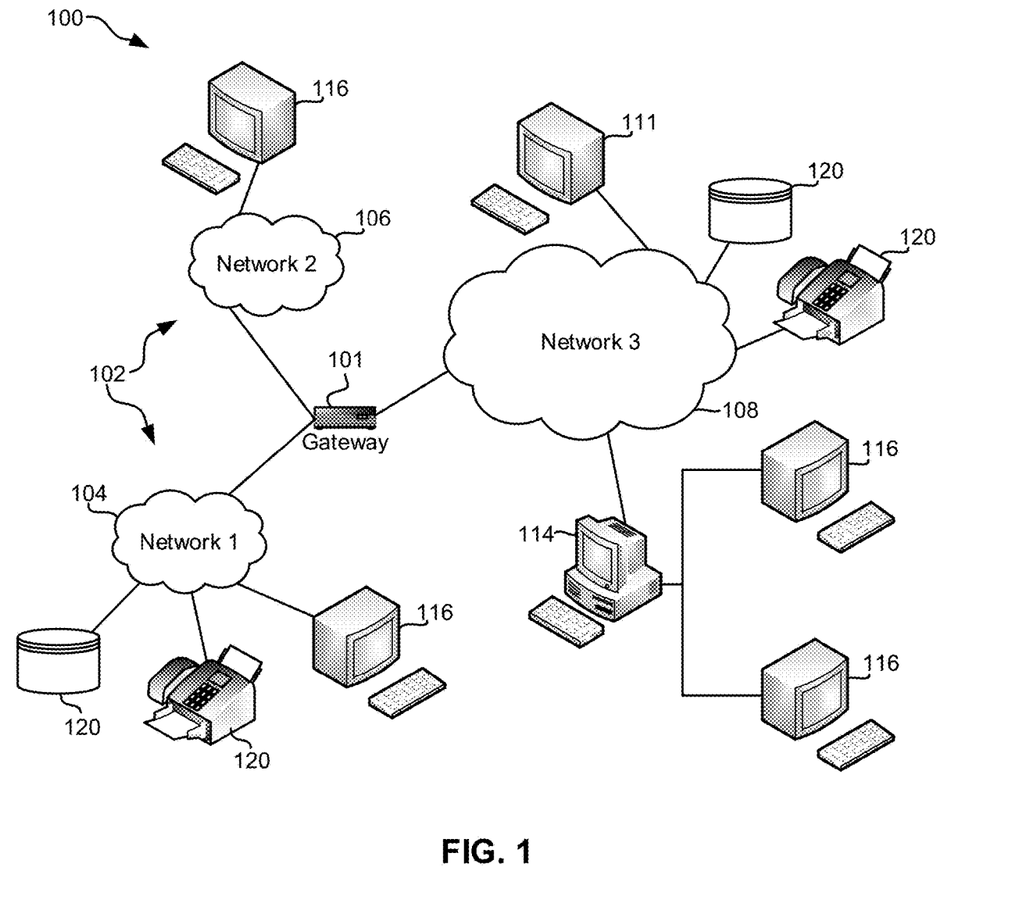
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
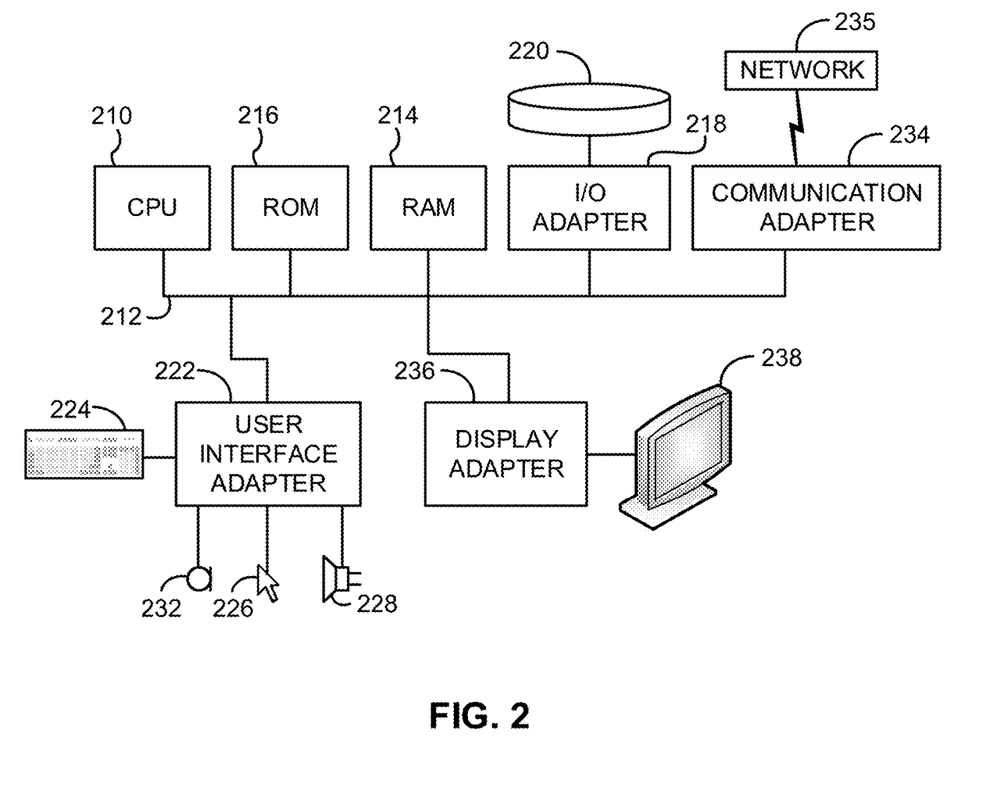
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
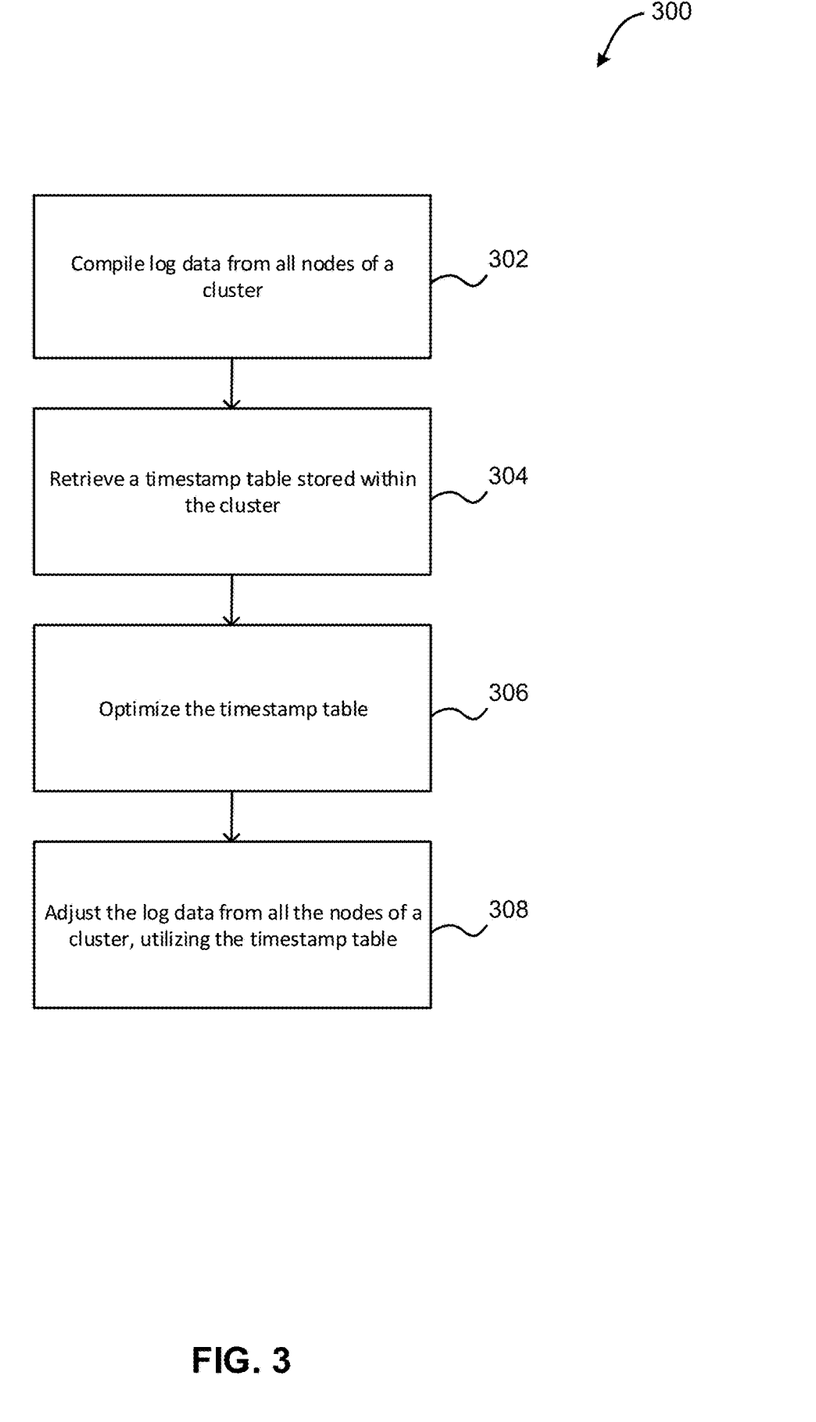
FIG. 3 illustrates a method for synchronizing log data within a cluster, in accordance with one embodiment.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where log data from all the nodes of a cluster is compiled. In one embodiment, the log data may include all log data associated with all protocol servers running on all of the nodes of the cluster. In another embodiment, the log data from all the nodes of the cluster may be compiled at one or more nodes within the cluster, at the node of the cluster that receives the log data, at a computing device separate from the cluster, etc. For example, the log data from all the nodes of the cluster may be compiled into a single data file. In another example, each log and associated node may be identified within the single data file.

Additionally, in one embodiment, the log data may include a plurality of log files. For example, each log file may include logged events with associated timestamps. In another example, each of the timestamps may be created utilizing a clock of the node in which the log file is created.

Further, in one embodiment, the log data may be compiled in response to a request for the log data. In another embodiment, the request may be received at a node of the cluster. In yet another embodiment, the request may be distributed by the node that received the request to all nodes of the cluster. In still another embodiment, the cluster may include a plurality of nodes including the note that receives the request.

Further still, in one embodiment, the cluster may include a clustered file system. For example, a file system may be simultaneously mounted on each of the plurality of nodes of the cluster. In another example, data may be spread across multiple nodes of the clustered file system to improve redundancy, increase performance, etc. In yet another example, the clustered file system may provide concurrent access to data (e.g., files, objects, etc.) via the plurality of nodes.

Also, in one embodiment, different nodes within the cluster may utilize different operating systems. In another embodiment, one or more of the plurality of nodes may include a computing device including one or more hardware processors, one or more storage drives, one or more memories, etc. In yet another embodiment, one or more of the plurality of nodes may include a virtual node. In still another embodiment, the plurality of nodes may be distributed geographically.

In addition, in one embodiment, the cluster may include IBM Spectrum Scale™. In another embodiment, the request may be received at the node from a system outside of the cluster. For example, the request may be sent automatically from an application running on the system outside of the cluster. In another example, the request may be sent manually from a user via the system outside of the cluster.

Furthermore, in one embodiment, the request may be received in response to an issue within the cluster. For example, the issue may include failure of one or more nodes of the cluster. In another example, the issue may include failure of a communications network utilized by the cluster. In yet another example, the issue may include an identification of an improper operation of the cluster.

Further still, in one embodiment, the request for the log data may include a command. For example, the request for log data may include a "gpfs.snap" command. In another embodiment, the request may include a request to collect all log data from all nodes. In yet another embodiment, the log data may include protocol server log data. For example, the log data may include log data associated with all protocol servers running on each of the nodes of the cluster.

Also, method 300 may proceed with operation 304, where a timestamp table stored within the cluster is received. In one embodiment, the timestamp table may be retrieved at one or more nodes within the cluster, at the node of the cluster that receives the log data, at a computing device separate from the cluster, etc. In another embodiment, the timestamp table may include a textual document that stores synchronized timestamps from all nodes of the cluster.

Additionally, in one embodiment, the timestamp table may indicate a plurality of predetermined timestamp instances. For example, each row of the timestamp table may be associated with a single predetermined timestamp instance. In another embodiment, at each of the plurality of predetermined timestamp instances, each node within the cluster may determine a timestamp (e.g., a time and date) from a system clock of the corresponding node, and may add an entry to the timestamp table indicating the timestamp. This may result in a timestamp table that has a plurality of predetermined timestamp instances (e.g., indicated by columns within a table, etc.), where each timestamp instance includes a timestamp from each of the plurality of nodes within the cluster (e.g., where timestamps for a single node are represented as a single column corresponding to that node within the table, etc.).

Further, in one embodiment, the predetermined timestamp instances may be ordered chronologically within the timestamp table. For example, within the timestamp table, timestamp instances with an earlier timestamp (date, time, etc.) may be located after timestamp instances within a later timestamp. In another embodiment, the timestamp table may be created utilizing a shared repository within the cluster.

For example, documents within the shared repository may be accessible and editable by each node within the cluster. In another example, edits made to documents within the shared repository may be propagated to all nodes. In yet another example, the shared repository may include a cluster configuration repository (CCR). In still another example, the shared repository may also store configuration data files used to determine a protocol server configuration to be implemented within a node.

Further still, method 300 may proceed with operation 306, where the timestamp table is optimized. In one embodiment, the timestamp table may be optimized at one or more nodes within the cluster, at the node of the cluster that receives the log data, at a computing device separate from the cluster, etc. In another embodiment, optimizing the timestamp table may include selecting a reference node within the table. For example, the node within the table that has the lowest time and date value for the first predetermined timestamp instance may be selected as the reference node. In another example, if a subset of nodes share the lowest time and data value for the first predetermined timestamp instance, one of the subset of nodes may be randomly selected as the reference node.

Also, in one embodiment, optimizing the timestamp table may include creating a time difference table utilizing the timestamp table. For example, the time difference table may list in a first column all timestamps for the reference node. For instance, these timestamps may correspond to the timestamps listed for the reference node in the timestamp table. In another example, for each node of the cluster other than the reference node, the timestamp indicated by that node for each timestamp instance within the timestamp table is compared to the corresponding timestamp indicated by the reference node for that timestamp instance.

In addition, in one embodiment, the difference between the timestamp for the node and the timestamp for the reference node is determined and added to the time difference table at that timestamp instance. In this way, the time difference table may include the same timestamp instances as the timestamp table e.g., indicated by columns within the table, etc.), where for each node in the cluster, each timestamp instance includes a difference value indicating a difference between the node's timestamp and the reference node's timestamp (e.g., where difference values for a single node are represented as a single column corresponding to that node within the table, etc.).

Furthermore, in one embodiment, optimizing the time difference table may include removing redundant entries from the time difference table to create an optimized time difference table. For example, rows indicating predetermined timestamp instances may be ordered chronologically within the time difference table. In another example, consecutive rows within the time difference table are compared (where each row indicates a unique timestamp instance).

Further still, in one example, if it is determined that all entries in consecutive rows match within the time difference table, the later matching row (e.g., the row indicating a predetermined timestamp instance that occurs later than the matching consecutive row) is removed from the time difference table. In this way, entries with the earliest time difference are saved, and later matching time differences are removed.

This may create a time difference table that indicates an earliest recorded timestamp instance of a particular time difference between logged times for nodes. Additionally, this may also minimize a size of the time difference table, which may reduce an amount of storage space necessary to store the time difference table, and may reduce and amount of computing capability necessary to analyze/process the time difference table.

Also, in one embodiment, optimizing the timestamp table may include creating an optimized timestamp table, utilizing the optimized time difference table. For example, for each timestamp instance within the time difference table, the difference value for each node may be combined with the corresponding timestamp for the reference node in order to determine the timestamp for the node. In another example, this timestamp may be substituted for the difference value to create the optimized timestamp table.

Additionally, in one example, rows within the original timestamp table corresponding to the removed rows within the optimized time difference table may also be removed in the original timestamp table to create the optimized timestamp table. In this way, the optimized timestamp table includes a first row indicating timestamps for a reference node, and also includes additional rows, where each row is associated with an additional node within the cluster, where each entry in these additional rows indicates a timestamp recorded by the note during at the corresponding timestamp instance.

Further, method 300 may proceed with operation 308, where the log data from all the nodes of a cluster is adjusted, utilizing the timestamp table. In one embodiment, the request for the log data may include a predetermined flag. For example, a "gpfs.snap" command may include a "-timesync" flag appended to the command when the command is received.

Further still, in one embodiment, the compiled log data from all the nodes of the cluster may be adjusted automatically in response to the predetermined flag, utilizing the optimized timestamp table and/or the optimized time difference table. For example, the log data may include a plurality of log files for a plurality of nodes. In another example, timestamps for all log files for a predetermined node may be compared to the optimized time difference table.

Also, in one example, for the predetermined node, timestamps within log files that occur after a first timestamp instance and before a second timestamp instance within the optimized time difference table may be corrected according to the value corresponding to the predetermined node at the first timestamp instance. In another example, a corrected timestamp may be substituted for the original timestamp or appended to the original timestamp. In one embodiment, the compiled log data may be adjusted to created adjusted compiled log data.

In another embodiment, one or more debugging actions may be performed, utilizing the adjusted compiled log data. For example, the adjusted compiled log data may be automatically analyzed in order to determine one or more issues within the cluster. For example, debugging may be automatically performed within the cluster, utilizing the adjusted compiled log data. In another example, the one or more determined issues may be automatically resolved, based on the analyzing. For example, one or more adjustments may be made to one or more nodes automatically within the cluster in order to resolve the one or more determined issues. In this way, a performance of the cluster may be improved, based on an analysis of the adjusted compiled log data.

In this way, compiled log data may be corrected and refined in order to trace down problems within the cluster. This may reduce an amount of processing performed during support and/or debugging actions. For example, debugging may be performed manually or automatically via one or more applications. For instance, an application may identify a problem within the cluster, may sends a command to compile log data within the cluster, and may automatically parse and analyze the adjusted log data. By synchronizing log data between nodes of the cluster, the adjusted log data may improve a performance of the parsing and analysis by improving a quality and usefulness of the resulting timestamps within the compiled log data.

Figure 4:
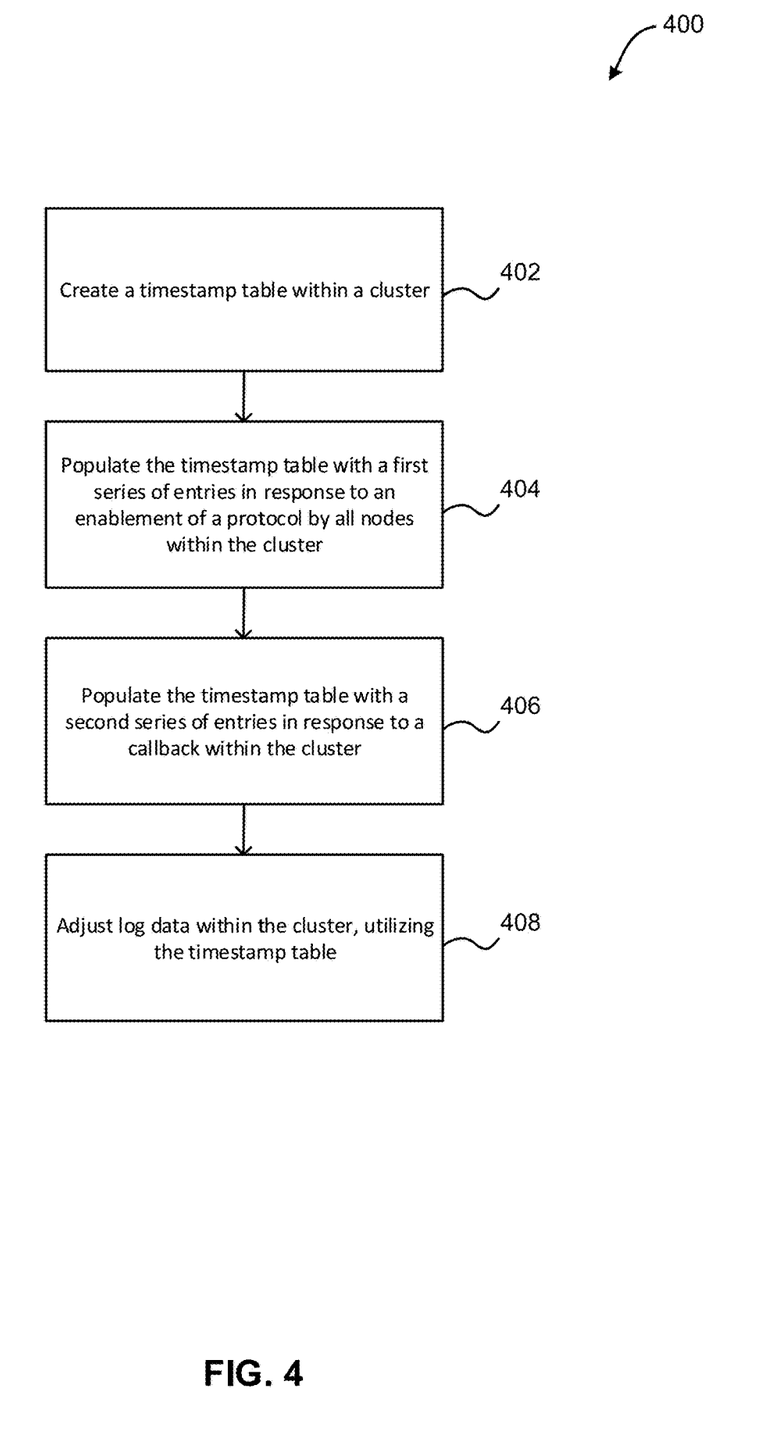
FIG. 4 illustrates a method for creating, updating, and utilizing a timestamp table, in accordance with one embodiment.

Now referring to FIG. 4, a flowchart of a method 400 for creating, updating, and utilizing a timestamp table is shown according to one embodiment. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a timestamp table is created within a cluster. In one embodiment, the timestamp table may be created by one or more nodes within the cluster, by a system outside of the cluster, etc. In another embodiment, the timestamp table may be stored in a shared repository accessible to all nodes within the cluster. For example, the timestamp table may be stored in a cluster configuration repository (CCR). In another example, the timestamp table may include a shared single copy that is accessible by all nodes within the cluster.

Additionally, in one embodiment, the timestamp table may be created in response to the enabling of a protocol for a first time by all nodes within the cluster. In another embodiment, the timestamp table may include a text file. In yet another embodiment, the timestamp table may include a column for each node within the cluster. In still another embodiment, the timestamp table may be separate from log data maintained by the nodes of the cluster.

Further, method 400 may proceed with operation 404, where the timestamp table is populated with a first series of entries in response to an enablement of a protocol by all nodes within the cluster. In one embodiment, each of the first series of entries may include a timestamp determined at a node of the cluster. For example, when the protocol is enabled within the cluster, each node within the cluster adds a timestamp to the table at a single predetermined timestamp instance.

Further still, in one embodiment, a command to enable the protocol may be sent to all the nodes within the cluster. In another embodiment, the command may also include instructions to log the current time of the node within the table. In yet another embodiment, the timestamp may be determined by a node by referring to a clock implemented at the node, and logging the time and/or date indicated by the clock.

Also, in one embodiment, enabling the protocol may include installing necessary software (e.g., protocol servers, etc.) onto one or more nodes of the cluster. In another embodiment, enabling the protocol may include starting one or more protocol servers within the nodes of the cluster. In yet another embodiment, enabling the protocol may include accessing, by each node of the cluster, configuration data files stored in the shared repository in order to determine a configuration to be implemented via that node.

In addition, method 400 may proceed with operation 406, where the timestamp table is populated with a second series of entries in response to a callback within the cluster. In one embodiment, the callback may be sent to nodes within the cluster in response to an event. In another embodiment, the events may include the failure of a node within the cluster, the addition of a node to the cluster, etc. In yet another embodiment, the node associated with the event (e.g., the failed node, the new node, etc.) may send the callback to the other nodes of the cluster.

Furthermore, in one embodiment, the callback may include a triggering event used to notify nodes within the cluster of the event. In another embodiment, each node within the cluster may update the table in the shared repository with a current timestamp at a single new predetermined timestamp instance in response to receiving the callback. In yet another embodiment, the node sending the callback may also update the table with a corresponding timestamp. In this way, a new row of entries may be created in the timestamp table (e.g., at the at a single new predetermined timestamp instance) in response to a callback.

Further still, method 400 may proceed with operation 408, where log data within the cluster is adjusted, utilizing the timestamp table. In one embodiment, a time difference table may be created and optimized utilizing the timestamp table. In another embodiment, the timestamp table may be optimized, utilizing the optimized time difference table. In yet another embodiment, timestamps within the log data may be adjusted, utilizing one or more of the optimized timestamp table and the optimized time difference table. For example, timestamps within the log data may be synchronized with timestamps for a selected reference node.

In this way, a timestamp table may be created and maintained within the cluster, and may be used to synchronize timestamps within log data in order to reduce an amount of processing performed during support and/or debugging actions utilizing the log data.

Figure 5:
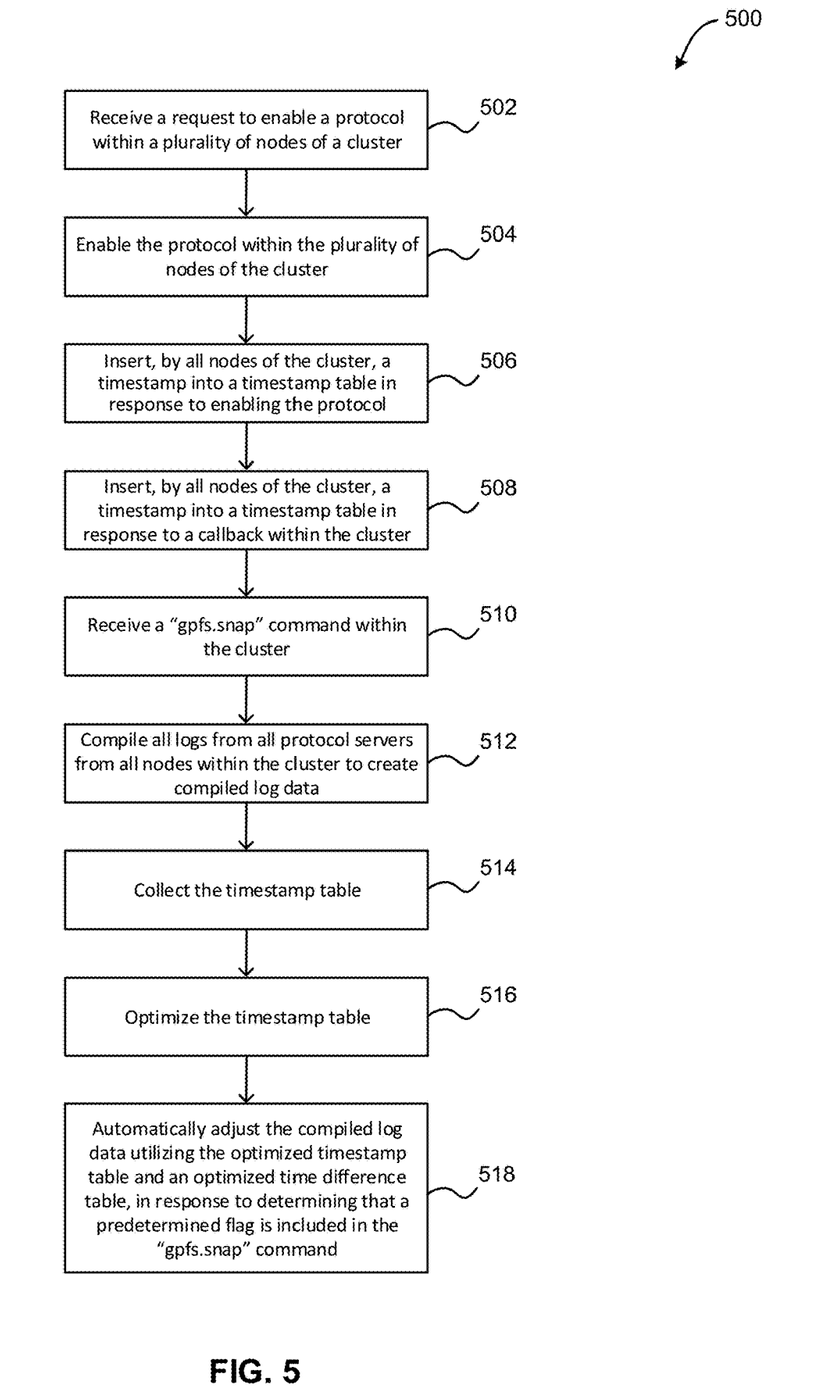
FIG. 5 illustrates a method for adjusting compiled log data utilizing a timestamp table, in accordance with one embodiment.

Now referring to FIG. 5, a flowchart of a method 500 for adjusting compiled log data utilizing a timestamp table is shown according to one embodiment. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field pro-grammable gate array (FPGA), etc., combinations thereof, or any other suitable computing device known in the art.

As shown in FIG. 5, method 500 may initiate with operation 502, where a request to enable a protocol within a plurality of nodes of a cluster is received. In one embodiment, the request may be received from a user, an application, etc. In another embodiment, the request may include a received command. In yet another embodiment, the request may be received at a node of the cluster and may be relayed to all other nodes of the cluster.

Additionally, method 500 may proceed with operation 504, where the protocol is enabled within the plurality of nodes of the cluster. For example, configuration data files stored in a shared repository may be accessed by each node of the cluster in order to determine a configuration to be implemented via that node. In one embodiment, the protocol may be implemented within each node, utilizing the determined configuration.

Further, method 500 may proceed with operation 506, where a timestamp is inserted by all nodes of the cluster into a timestamp table in response to enabling the protocol. In one embodiment, the timestamp table may be created in a shared repository of the cluster. In another embodiment, for each node within the cluster, a timestamp may be added to the table that indicates a time that the protocol was enabled within the node. In yet another embodiment, the time may be obtained utilizing a clock of the node.

Further still, method 500 may proceed with operation 508, where a timestamp is inserted by all nodes of the cluster into a timestamp table in response to a callback within the cluster. In one embodiment, a callback may be sent within the cluster in response to a restart/recovery of a node within the cluster. In another embodiment, a callback may be sent within the cluster in response to a creation of a new node within the cluster. In yet another embodiment, a callback may be sent from a restarted/recovered/new node to all other nodes within the cluster. In still another embodiment, for each node within the cluster, a timestamp may be added to the table that indicates a time that the callback was received.

Also, method 500 may proceed with operation 510, where a "gpfs.snap" command is received within the cluster. In one embodiment, the "gpfs.snap" command may be received at a single node within the cluster. In addition, method 500 may proceed with operation 512, where all logs from all protocol servers from all nodes within the cluster are compiled to create compiled log data. In one embodiment, the compiled log may be created in response to the "gpfs.snap" command. In another embodiment, the compiled log may be sent to the node that requested it within the cluster.

Furthermore, method 500 may proceed with operation 514, where a timestamp table is collected. For example, the timestamp table may be collected from a shared repository within the cluster. Further still, method 500 may proceed with operation 516, where the timestamp table is optimized. In one embodiment, optimizing the timestamp table may include selecting a reference node. In another embodiment, optimizing the timestamp table may include determining a difference between timestamps of each node and timestamps of reference node.

Further still, in one embodiment, optimizing the timestamp table may include storing the differences between timestamps of each node and timestamps of reference node in a time difference table. In another embodiment, optimizing the timestamp table may include determining and eliminating redundant rows within the time difference table to create an optimized time difference table. In yet another embodiment, optimizing the timestamp table may include determining and eliminating redundant rows within the timestamp table to create an optimized timestamp table, utilizing the time difference table.

Also, method 500 may proceed with operation 518, where the compiled log data is automatically adjusted utilizing the optimized timestamp table and optimized time difference table, in response to determining that a predetermined flag is included in the "gpfs.snap" command. In one embodiment, the predetermined flag may include predetermined text appended to the "gpfs.snap" command (e.g., "-time-sync," etc.). In another embodiment, the compiled log data may be adjusted to account for time differences between timestamps for each of the nodes within the cluster.

CCR-Enabled Log Time Synchronization for Spectrum Scale Protocols

In one embodiment, IBM Spectrum Scale™ is one exemplary clustered file system that provides concurrent access to a single file system or set of file systems from multiple nodes. IBM Spectrum Scale has many features beyond common data access including data replication, policy based storage management, and multi-site operations. You can create a cluster of AIX® nodes, Linux nodes, Windows server nodes, or a mix of all three. IBM Spectrum Scale can run on virtualized instances providing common data access in environments, leverage logical partitioning, or other hypervisors. Multiple IBM Spectrum Scale clusters can share data within a location or across wide area network (WAN) connections.

IBM Spectrum Scale includes protocol support which includes NFS, SMB and Object. Because of this protocol support, the same data can be accessed by different interface (File/Object). The protocol nodes are cluster aware and protocol services/components are not limited to single node—they can talk to other services on other nodes. This is done to improve the performance as well as to improve fail over and support high availability.

Cluster Configuration Repository

In one embodiment, the master copy of configuration data files may be stored redundantly on all quorum nodes instead of separately designated primary/backup configuration server nodes. This method of storing configuration data is called a cluster configuration repository (CCR). GPFS™ commands store configuration and file system information in one or more files collectively known as GPFS cluster configuration data files. The CCR is implemented across the cluster and all nodes can access the CCR.

Network Time Protocol (NTP)

A network time protocol (NTP) is a networking protocol for clock synchronization between computer systems over packet-switched, variable-latency data networks.

In one embodiment, each protocol has various different components. For example, Object has Proxy Server, Object Server, Container Server, Account server, Keystone, Postgres, etc. Most of these protocols are open source and integrated in the Spectrum Scale. Proxy services interact with one or more other services during I/O on same node or on other nodes. Mostly each service/component has its own log file.

Ideally all nodes should be configured to have the same time. This may be achieved via configuring the NTP server for all the nodes. Usually the NTP server is an external server. Having an NTP server only for a Spectrum Scale protocol node is an additional requirement. If a customer does not have an NTP server, they might set up the same time across all the spectrum scale nodes.

There are cases where a time on some of the nodes can be slightly different. It might be because of manual configuration mistakes, an inability to an NTP server, etc. Now suppose there is difference of time between two or more nodes. It can be few seconds. Now for the object uploaded request it first goes to the keystone which internally goes to postgres, returns the token and then the request goes to the proxy server which validates the request by contacting the keystone and if the request is valid then it is sent to the object. Now each of the services can be running on different nodes, and there are some supplementary services running in background to assist the overall object functionality. At any given time, there can be many requests being served by all the protocol nodes.

Now suppose the request failed at some point and a support team/development team wants to debug the issue by looking at the gpfs snap which contains all the collected logs from Spectrum Scale system. The support team/developer/debugging application tries to find the issue by looking at errors in the log file or the details given by customer as to which object upload failed etc. In case of the object, one can trace the issue by looking at transaction number for the failed object upload. Now the person or application must trace all the steps from all the logs using that transaction ID to understand the actual problem. Now the person or application debugging the problem should be aware of a communication flow between all these components so that they can join the dots using logs. The developer, support team member, or debugging application may not be aware of all these flows so they may have to rely on the logs and based on a log's timestamp, they may attempt to create the flow. The wrong flow may be created if there is a time difference between nodes on which these components were running. This may cause a delay in finding the problem, and may prevent a solution from being obtained in general.

One exemplary solution will make sure that log time stamps are adjusted properly so that the support team/developer/debugging application can trace the flow using logs even if they are not fully aware of the flow.

Exemplary Solution

In one embodiment, during a first-time protocol enablement, a timestamp table (e.g., a text file) will be created in CCR with the format shown in Table 1.

TABLE 1

| Sr. No. | Node 1 | Node 2 | Node3 | Node N |
|---------|--------|--------|-------|--------|

Additionally, during the first-time enablement of the protocol nodes, the timestamp table will be updated with current time on the node, as shown in Table 2.

TABLE 2

| Sr. No. | Node 1 | Node 2 | Node3 | Node N |
|---------|--------|--------|-------|--------|
| 1 | Tue Jul 10 13:22:57 UTC 2018 | Tue Jul 10 13:24:57 UTC 2018 | Tue Jul 10 13:23:57 UTC 2018 | Tue Jul 10 13:22:57 UTC 2018 |

Further, during a service restart/start/node add, the timestamp table will be updated with a current timestamp using a callback, as shown in Table 3. If an administrator wishes to change a system time explicitly (e.g. "date-s<newtime>"), then the administrator may make sure to update the latest time stamp in this table for all nodes.

TABLE 3

| Sr. No. | Node 1 | Node 2 | Node3 | Node N |
|---|---|---|---|---|
| 1 | Tue Jul 10 13:22:57 UTC 2018 | Tue Jul 10 13:24:57 UTC 2018 | Tue Jul 10 13:23:57 UTC 2018 | Tue Jul 10 13:22:57 UTC 2018 |
| 2 | Tue Jul 10 13:45:09 UTC 2018 | Tue Jul 10 13:47:09 UTC 2018 | Tue Jul 10 13:46:09 UTC 2018 | Tue Jul 10 13:45:09 UTC 2018 |
| 3 | Tue Jul 10 13:55:51 UTC 2018 | Tue Jul 10 13:57:51 UTC 2018 | Tue Jul 10 13:56:51 UTC 2018 | Tue Jul 10 13:56:51 UTC 2018 |

Further still, a "gpfs.snap" command to collect the logs may be received. Also, from the first entry in the timestamp table, one node will be chosen as the reference node. The node with lowest timestamp will be chosen and updated in CCR. If there are multiple node with same lowest timestamp, then one will be chosen in the random and updated in CCR. As shown in Table 3, Node1 has the lowest timestamp (bolded) and is therefore chosen as the reference node.

Also, the timestamp table is then optimized. For example, a time difference table is created based on timestamp table. An exemplary time difference table is shown in Table 4.

TABLE 4

| Sr. No. | Node 1 | Node 2-Node1 | Node3-Node1 | NodeN-Node1 |
|---|---|---|---|---|
| 1 | Tue Jul 10 13:22:57 UTC 2018 | 00:02:00 | 00:01:00 | 00:00:00 |
| 2 | Tue Jul 10 13:45:09 UTC 2018 | 00:02:00 | 00:01:00 | 00:00:00 |
| 3 | Tue Jul 10 13:55:51 UTC 2018 | 00:02:00 | 00:01:00 | 00:01:00 |

In addition, if the difference is same for a previous row and an immediate next row, then the next row will be deleted. For example, in Table 4, row 1 and row2 have the same difference between time for all nodes. As a result, row 2 will be deleted from both tables and row 3 will become row2 within an optimized time difference table, as shown in Table 5.

TABLE 5

| Sr. No. | Node 1 | Node 2-Node1 | Node3-Node1 | NodeN-Node1 |
|---|---|---|---|---|
| 1 | Tue Jul 10 13:22:57 UTC 2018 | 00:02:00 | 00:01:00 | 00:00:00 |
| 2 | Tue Jul 10 13:55:51 UTC 2018 | 00:02:00 | 00:01:00 | 00:01:00 |

Furthermore, the timestamp table may be optimized, utilizing the optimized time difference table. For example, Table 6 illustrates an optimized timestamp table created by cross-referencing the timestamp table in Table 3 and the optimized time difference table in Table 5.

TABLE 6

| Sr. No. | Node 1 | Node 2 | Node3 | Node N |
|---|---|---|---|---|
| 1 | Tue Jul 10 13:22:57 UTC 2018 | Tue Jul 10 13:24:57 UTC 2018 | Tue Jul 10 13:23:57 UTC 2018 | Tue Jul 10 13:22:57 UTC 2018 |
| 2 | Tue Jul 10 13:55:51 UTC 2018 | Tue Jul 10 13:57:51 UTC 2018 | Tue Jul 10 13:56:51 UTC 2018 | Tue Jul 10 13:56:51 UTC 2018 |

Now if a user specifies a special flag in the "gpfs.snap" command (e.g., "gpfs.snap—time-sync"), then the gpfs.snap command will add a corrected time stamp in all the retrieved log files. For example, for each node apart from node1, and for each log file of the node, for log lines between the 1st and 2nd timestamp of the difference table, a new stamp is added at the beginning. The new Timestamp will be the time in the log line minus the difference from the time difference table.

For example, for all the lines on Node 2 between timestamp 13:24:57 to 13:57:51, the new timestamp (current log timestamp–difference) may be added to the log. For example, for a log line with a timestamp 13:26:57, an additional timestamp is added which will be 13:24:57 (13:26:57-Difference).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
compiling log data from a plurality of nodes of a cluster;
retrieving a timestamp table stored within the cluster, the timestamp table including synchronized timestamps from the plurality of nodes;
selecting a reference node from the plurality of nodes;
creating a time difference table that includes differences between timestamps for the reference node and timestamps for each of the plurality of nodes other than the reference node;
creating an optimized timestamp table, utilizing the timestamp table and the time difference table;

adjusting the log data from the plurality of nodes, utilizing the optimized timestamp table; and storing the adjusted log data in a hardware memory, wherein the log data includes all log data associated with all protocol servers running on the plurality of the nodes, wherein the timestamp table is retrieved from a node of the cluster that receives the log data from each node of the plurality of nodes, wherein, in response to determining that a subset of the nodes in the plurality of nodes share a lowest time and data value for a predetermined timestamp instance within the timestamp table, one of the subset of nodes is randomly selected as the reference node, wherein the log data is compiled in response to a request, the request including a predetermined flag, wherein adjusting the log data from the plurality of nodes includes, for each node of the plurality of nodes, correcting timestamps within log files that occur after a first timestamp instance and before a second timestamp instance within the time difference table according to a value corresponding to the node at the first timestamp instance within the time difference table.

2. The computer-implemented method of claim 1, comprising determining one or more issues in the cluster using the adjusted log data.

3. The computer-implemented method of claim 1, wherein the timestamp table is retrieved from a node of the cluster that receives the log data from each node of the plurality of nodes.

4. The computer-implemented method of claim 1, wherein the timestamp table indicates a plurality of predetermined timestamp instances, where each of the predetermined timestamp instances includes a timestamp from a corresponding node of the plurality of nodes within the cluster.

5. The computer-implemented method of claim 1, wherein the time difference table includes:

a first column listing timestamps for the reference node, and a plurality of additional columns that include difference values indicating differences between timestamps for each node of the plurality of nodes and timestamps for the reference node.

6. The computer-implemented method of claim 1, further comprising performing one or more debugging actions using the adjusted log data for determining one or more issues within the cluster.

7. The computer-implemented method of claim 1, further comprising analyzing the adjusted log data to determine one or more issues within the cluster; and resolving the one or more issues thereby improving a performance of the cluster.

8. The computer-implemented method of claim 1, further comprising removing redundant entries from the time difference table.

9. The computer-implemented method of claim 1, wherein adjusting the log data includes synchronizing timestamps within the log data with timestamps for the reference node within the optimized timestamp table.

10. The computer-implemented method of claim 1, wherein the log data is compiled in response to a request, the request including a predetermined flag.

11. A computer program product comprising one or more computer readable storage media, and program instructions collectively stored on the one or more computer readable storage media, the program instructions comprising instructions configured to cause one or more processors to perform a method comprising:

compiling, utilizing the one or more processors, log data from a plurality of nodes of a cluster;

retrieving, utilizing the one or more processors, a timestamp table stored within the cluster, the timestamp table including synchronized timestamps from the plurality of nodes;

selecting, utilizing the one or more processors, a reference node from the plurality of nodes;

creating, utilizing the one or more processors, a time difference table that includes differences between timestamps for the reference node and timestamps for each node of the plurality of nodes other than the reference node;

creating, utilizing the one or more processors, an optimized timestamp table, utilizing the timestamp table and the time difference table, the creating including performing the following operations for each node of the plurality of nodes of the cluster:

for each timestamp instance within the time difference table, combining a time difference value for the node with a corresponding timestamp for the reference node within the timestamp table to determine an optimized timestamp for the node, and substituting the optimized timestamp for the time difference value for the node within the time difference table;

adjusting, utilizing the one or more processors, the log data from the plurality of nodes, utilizing the optimized timestamp table; and storing, utilizing the one or more processors, the adjusted log data in a hardware memory.

12. The computer program product of claim 11, further comprising performing one or more debugging actions using the adjusted log data for determining one or more issues within the cluster; and resolving the one or more issues thereby improving a performance of the cluster.

13. The computer program product of claim 12, wherein the timestamp table is retrieved from a node of the cluster that receives the log data from each node of the plurality of nodes, wherein, in response to determining that a subset of the nodes in the plurality of nodes share a lowest time and data value for a predetermined timestamp instance within the timestamp table, one of the subset of nodes is randomly selected as the reference node, wherein the log data is compiled in response to a request, the request including a predetermined flag, wherein adjusting the log data from the plurality of nodes includes, for each node of the plurality of nodes, correcting timestamps within log files that occur after a first timestamp instance and before a second timestamp instance within the time difference table according to a value corresponding to the node at the first timestamp instance within the time difference table.

14. The computer program product of claim 11, wherein the timestamp table indicates a plurality of predetermined timestamp instances, where each of the predetermined timestamp instances includes a timestamp from a corresponding one of the nodes of the plurality of nodes.

15. The computer program product of claim 11, wherein the time difference table includes:

a first column listing timestamps for the reference node, and a plurality of additional columns that include difference values indicating differences between timestamps for each node of the plurality of nodes and timestamps for the reference node.

16. The computer program product of claim 11, wherein in response to determining that a subset of nodes within the timestamp table share a lowest time and data value for a predetermined timestamp instance, one of the subset of nodes is randomly selected as the reference node.

17. The computer program product of claim 11, comprising analyzing, utilizing the one or more processors, the adjusted log data to determine one or more issues within the cluster.

18. The computer program product of claim 11, comprising removing, utilizing the one or more processors, redundant entries from the time difference table.

19. A system, comprising:
a processor; and
logic integrated with the processor, executable by the processor, or integrated with and executable by the processor, the logic being configured to:
compile log data from a plurality of nodes of a cluster;
retrieve a timestamp table stored within the cluster, the timestamp table including synchronized timestamps from the plurality of nodes;
select a reference node from the plurality of nodes;
create a time difference table that includes differences between timestamps for the reference node and timestamps for each of the nodes other than the reference node;
create an optimized timestamp table, utilizing the timestamp table and the time difference table; and
adjust the log data from the plurality of nodes, utilizing the optimized timestamp table, wherein adjusting the log data from the plurality of nodes includes, for each node of the plurality of nodes, correcting timestamps within log files that occur after a first timestamp instance and before a second timestamp instance within the time difference table according to a value corresponding to the node at the first timestamp instance within the time difference table;
determining one or more issues in the cluster using the adjusted log data; and
resolving the one or more issues thereby improving a performance of the cluster.

20. The computer-implemented method of claim 1, wherein creating the optimized timestamp table includes performing the following operations for each node of the plurality of nodes:
for each timestamp instance within the time difference table, combining a time difference value for the node with a corresponding timestamp for the reference node within the timestamp table to determine an optimized timestamp for the node, and
substituting the optimized timestamp for the time difference value for the node within the time difference table.

* * * * *